United States Patent
Jung

[15] 3,640,499
[45] Feb. 8, 1972

[54] REGISTER CONSTRUCTION FOR CLOSING OFF CIRCULAR-CYLINDRICAL FLOW DUCTS

[72] Inventor: Richard Jung, Gummersbach, Germany
[73] Assignee: L & C Steinmuller G.m.b.H., Gummersbach, Rhineland, Germany
[22] Filed: Dec. 10, 1969
[21] Appl. No.: 883,748

[30] Foreign Application Priority Data
Dec. 11, 1968 Germany .................. P 18 13 885.7

[52] U.S. Cl. ........................................... 251/305, 251/118
[51] Int. Cl. ........................................................ F16k 1/22
[58] Field of Search ............... 251/170, 173, 305, 306, 307, 251/308, 11 B; 137/454.2

[56] References Cited

UNITED STATES PATENTS

| | | | |
|---|---|---|---|
| 1,251,453 | 12/1917 | Spencer | 251/306 |
| 2,059,656 | 11/1936 | Ring | 251/173 UX |
| 2,299,865 | 10/1942 | Whitted | 251/306 X |
| 2,138,098 | 11/1938 | Holmes | 251/305 X |
| 2,673,708 | 3/1954 | Danks | 251/173 |
| 2,789,785 | 4/1957 | Woods | 251/173 X |
| 2,930,574 | 3/1960 | Sebardt | 251/170 |
| 3,291,443 | 12/1960 | Schulz et al | 251/305 |
| 2,614,887 | 10/1952 | Shields | 285/302 X |

*Primary Examiner*—Henry T. Klinksiek
*Attorney*—McGlew and Toren

[57] ABSTRACT

A register construction for closing off circular-cylindrical flow ducts includes a flexible cylindrical insert of a relatively thin material such as sheet metal or plastic which is mounted at one end to an annular flange which is secured to the flow duct and which includes an inner dimension which is slightly smaller than the duct with which it is to be associated. A circular flat plate valve or register member is pivotally mounted within the insert and the flow duct in a manner which permits it to be moved to close off the full area of the insert. The inner circumference of the insert is made slightly smaller than the circumference of the rotary plate so that in a closed position a formtight closure between the plate and the insert is obtained to close off all fluid flow through the duct.

3 Claims, 2 Drawing Figures

PATENTED FEB 8 1972

3,640,499

INVENTOR

RICHARD JUNG

BY: McGlew and Toren

ATTORNEYS 3,640,499

REGISTER CONSTRUCTION FOR CLOSING OFF CIRCULAR-CYLINDRICAL FLOW DUCTS cSUMMARY OF THE INVENTION

This invention relates in general to conduit-closing devices and in particular, to a new and useful valve or register assembly which includes an insert for the conduit through which the flow is to be regulated which is made of a flexible or semirigid material of a dimension which is slightly smaller than a rotary closing valve which is mounted therein, whereby to permit a form tight closure between the insert and the rotary valve when the latter is moved to a crossflow closing position.

When a circular-cylindrical duct particularly of large diameters is closed with a rotary register valve, there usually remains a permeability which is undesired in many practical cases of application. In a known design the geometric form of the closing edge at the register valve is adapted to the rigid duct wall, either by a precision which is sufficient in terms of manufacture, or because the register valve is provided with a flexible or deformable edging to insure as tight as possible a closure of the curvature of the interior of the duct. The flexibility of the register valve edge is achieved either by a covering consisting of asbestos or other soft materials or by an elastically flexible ring arranged in a groove on the circumference of the register valve. In the case of a flat plate register with an edge of soft material, the known disadvantages of these closing members consist in the possibility of wear which is caused by the closing forces, which will ultimately lead to leakage. In the case of the piston ring type register edge there is a limited adaptability of the edge to seal to the inevitable irregularities of the duct wall and there is a tendency for the piston ring edge to become fouled by solid materials which may pass therethrough. Owing to this, major permeabilities of the register valves, especially after a prolonged operating period, are inevitable. To achieve a tight closing of the register by manufacturing tolerances requires considerable expenditure.

In the case of hot air ducts, moreover, subsequent deformations due to inherent stresses of the welded duct sections cannot be precluded.

In accordance with the present invention there is provided a device for closing a round duct which includes a symmetrically mounted rotary register or valve plate which does not require a soft material packing and which does not have an irregular surface which is liable to collect deposits of dirt or debris. This is achieved by providing a cylindrical insert within the flow duct which is of a dimension slightly smaller than the interior of the duct and slightly smaller than the circumference of the rotary plate valve. Means are provided to hold the insert in position so that its walls are spaced from the interior of the flow duct and when the valve is positioned completely across the insert in a closing position it forms a formtight closure therewith and complete sealing. The insert is advantageously made of a flexible material or a semirigid material, and at least one end thereof is advantageously held in a spaced location away from the duct wall by means of a flange which mounts the insert to the duct wall in a fixed position. The opposite end of the insert may be similarly provided with an annular bead or indention which holds the interior wall of the insert at a spaced location from the interior wall of the duct. The form closure sealing between the rotary valve and the insert is accomplished by the deformation of the insert.

In one embodiment the insert may be tightly welded to the duct by a flange member which is formed at one end of the duct and an intermediate layer of a sealing material such as ,)am rubber, asbestos, or the like, is engaged between the angular flange member and the duct which with it is sealed.

Accordingly, it is an object of the invention to provide an improved valve assembly which includes a circularly cylindrical insert which is adapted to be positioned within a circular-cylindrical duct and which includes an interior wall with at least a portion thereof of a deformable material which is adapted to form a tight closure with a rotary valve member having a circularly cylindrical surface of a slightly larger size than the interior of the deformable portion of the insert.

A further object of the invention is to provide a flow duct construction which includes an insert of a semirigid or flexible material capable of deforming, and which includes an end with a flange portion which is secured to a duct wall in a manner to hold the interior wall of the insert in spaced relationship thereto, and including a rotary flat plate valve which is mounted for rotation within the insert and includes a circularly cylindrical circumference which is slightly larger than the interior cylindrical circumference of the insert, whereby the valve may be rotated across the insert to deform the insert into tight form-closing engagement therewith.

A further object of the invention is to provide a valve or register construction which is simple in design, rugged in construction, and economical to manufacture.

The various features of novelty which characterize the invention are pointed out with particularity in the claims annexed to and forming a part of this specification. For a better understanding of the invention, its operating advantages and specific objects attained by its uses, reference should be had to the accompanying drawings and descriptive matter in which there is illustrated a preferred embodiment of the invention.

GENERAL DESCRIPTION OF THE PREFERRED EMBODIMENT

Figure 1:
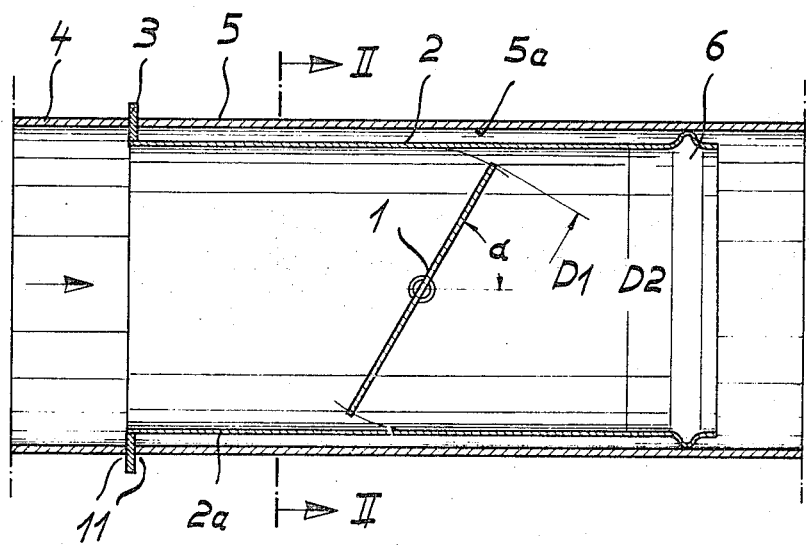
FIG. 1 is an axial sectional view of a duct having a register assembly constructed in accordance with the invention.

Referring to the drawings in particular, the invention embodied therein comprises a register or valve assembly which includes a rotary register plate or valve 1, having axles or journals 8, 8 at diametrically opposite sides which are rotatably mounted within bearings 10, 10 defined at diametrically opposite sides of a flow duct or conduit 5.

In accordance with the invention, the valve assembly includes an insert 2 made of a flexible or deformable material which includes an interior circularly cylindrical wall 2a which is held in spaced parallel relationship to the interior wall 5a of the duct 5. For this purpose, the insert 2 is provided with a flange or ring 3 at one end which is secured between a conduit 5 and a conduit extension 4 to provide a sealed engagement therewith such as by welding at 11.

In the embodiment illustrated, the insert 2 is provided with a bead formation or protuberance 6 which extends around its circumference and which provides a spacing of this end of the insert by an amount equivalent to the opposite end so as to hold the insert in parallel relationship with the interior wall of the duct 5.

The diameter $D_1$ of the circular register 1 is greater by an amount of a few millimeters than the diameter $D_2$ of the duct insert 2. Therefore, when the register 1 is rotated by a control handle 12 into a cross position, in which it encloses the flow through the ducts 4 and 5, which is reached at an angle alpha close to 90°, it will form a form closure with the insert 2 and shut off all flow. By the forces which the register 1 exerts on the thin walled insert 2 a tight closure between the rigid register edge and the flexible insert is attained.

In order to avoid accretions between the insert and the duct wall in the case of the handling of a gas which contains dust, the downstream end face of insert 2 can be connected tightly by providing a ring closure for this end in the same manner as the ring 3 at the opposite end. In some instances, however, it is preferable to provide an insert which is arranged within the flow duct by the interposition of a bilateral packing with a soft packing for each end of the insert 2.

Figure 2:
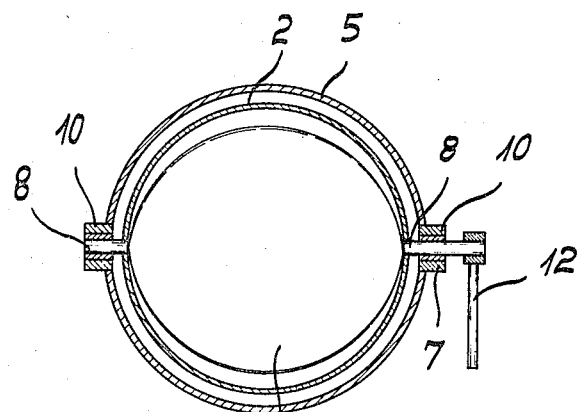
FIG. 2 is a section taken along the line 2—2 of FIG. 1.

As seen in FIG. 2, the journals 8 are advantageously mounted with sufficiently large play to easily permit the rotation of the valve plate 1 and a deformation of the insert.

What is claimed is:

1. A valve assembly including a flow duct of circularly cylindrical form, an insert of circularly cylindrical form within said flow duct being of a deformable material, means at each end of said insert for maintaining said insert in spaced relationship with the interior of said duct including a ring portion carried at one end of said insert and extending radially outwardly into fixed engagement with said flow duct adjacent one end of said insert and a bead formation at the opposite end of said insert extending radially outwardly therefrom into engagement with said duct wall adjacent the opposite end, a flat substantially cylindrical plate valve, a journal on said plate valve at diametrically opposite locations, bearing means defined on said duct rotatably supporting said journals, said plate valve being arranged within said insert intermediate its length and being of a circumference which is slightly greater than the interior circumference of said insert, whereby when said plate valve is rotated to a position transverse to the flow direction its circumferential portion deforms and tightly engages with said insert to finally close the flow duct.

2. An assembly according to claim 1, including means for sealing said ring to said duct at the upstream end of said insert, said bead being located at the downstream end.

3. An assembly according to claim 1, wherein said ring is connected around the periphery of said insert and extends through said duct and is welded to said duct.

* * * * *